United States Patent Office 3,103,910
Patented Sept. 17, 1963

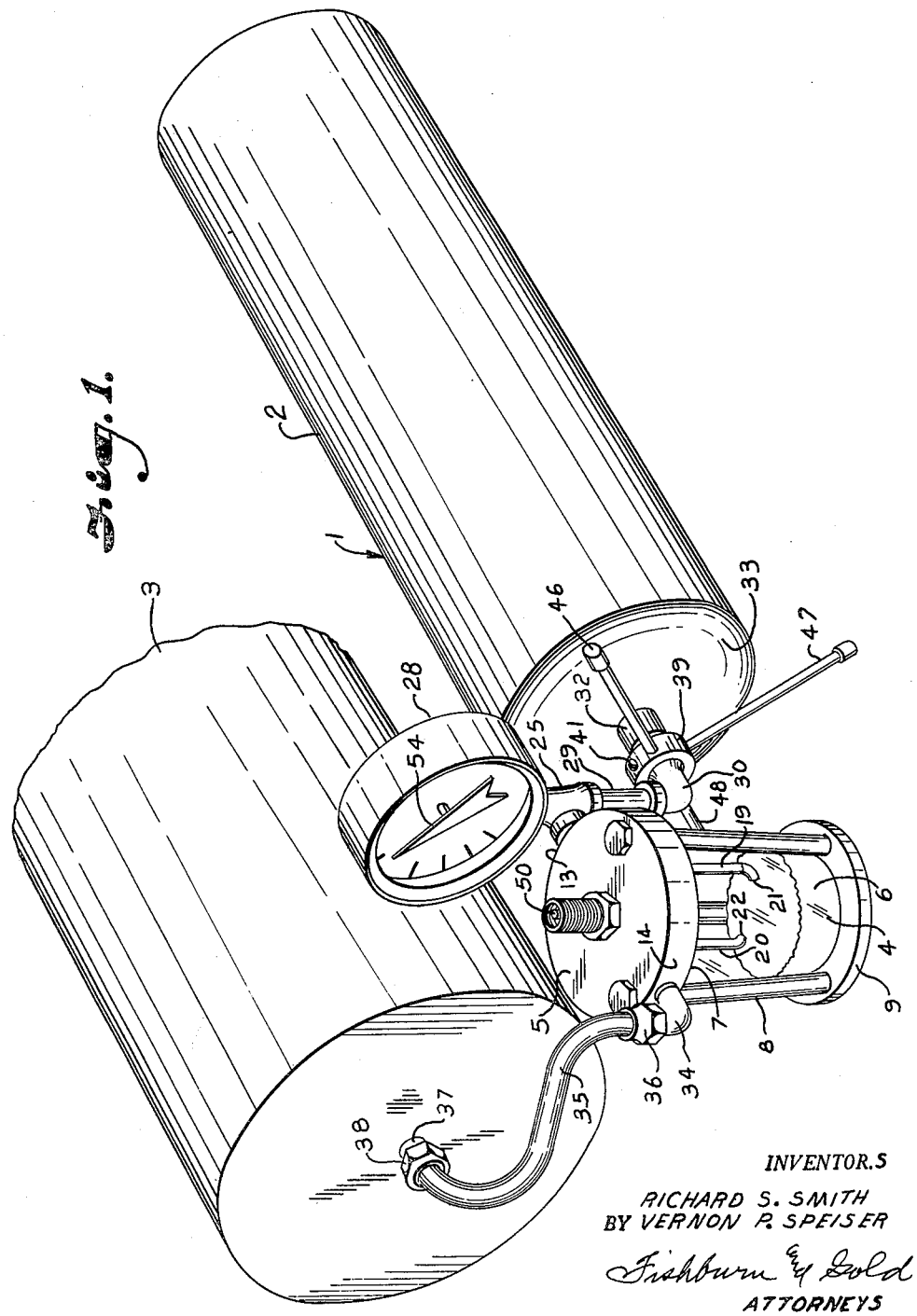

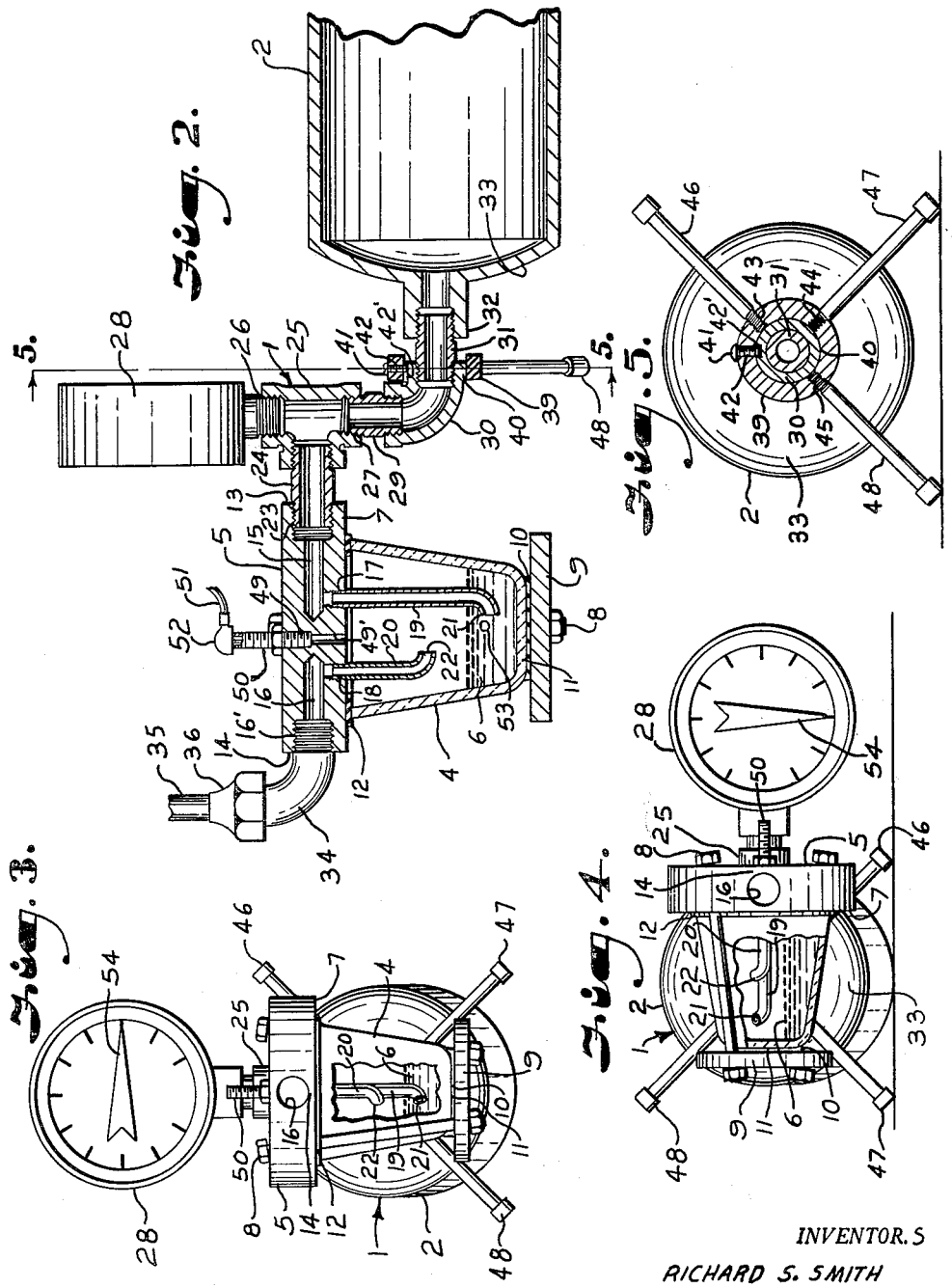

3,103,910
LEAK TESTING APPARATUS
Richard S. Smith, Prairie Village, Kans., and Vernon P. Speiser, Parkville, Mo. (both % The Cebis Company, 1016 E. 48th St., Kansas City 10, Mo.)
Filed Oct. 30, 1961, Ser. No. 149,826
3 Claims. (Cl. 116—117)

This invention relates to leak testing apparatus, and more particularly to a portable apparatus for testing and determining leaks in storage tanks, pipe line systems and the like.

It is the principal object of the present invention to provide a portable apparatus for testing and determining leaks in storage tanks and piping systems, wherein there is included a bubble chamber having tubes connected therewith and having line connection with the pressure tank and storage tank or piping system and having the tubes provided with curved ends, one of which is normally submerged in a liquid in the bubble chamber and wherein the apparatus may be rotated to a position wherein both curved ends of the tubes are out of the liquid for pressuring the apparatus from a source of supply.

Other objects of the present invention are to provide a pressure tank having a line connection with the head or body to which the bowl or bubble chamber is attached and the line having connection with the curved tube which is normally enclosed within the liquid in the bubble chamber; to provide a tubular connection with the storage tank or piping system having connection with the body of the bubble chamber and having a tube connected therewith with the end curved normally above the liquid in the bubble chamber; to provide a pressure gauge on the line connection between the body and storage tank; to provide the apparatus with a plurality of legs for supporting the same in two positions wherein in one position the tube from the pressure tank will be submerged within the liquid in the bubble chamber and in another position wherein it will be above the liquid in the chamber for pressurizing the apparatus; to provide means for securing the leg structure to the apparatus and to provide a device of this character simple and economical to manufacture.

The advantages of a portable apparatus of this character is in a compact unit assembly having no pump but which may be pressurized from an independent source when ready for use; a device which may be easily and quickly attached to and detached from a storage tank or piping system; it includes relatively few parts and particularly a body or head having tubular connection with the bubble chamber and with the storage and pressure tanks; the provision of a valve port for charging the pressure tank and the tank or piping system to be tested through the bubble chamber and tubes from a source of supply independent of the apparatus.

Other objects and advantages of this invention will become apparent from the following description taken in connection with the accompanying drawings wherein are set forth by way of illustration and example certain embodiments of this invention.

FIG. 1 is a perspective view of our leak detecting apparatus shown attached to the storage tank to be tested.

FIG. 2 is a cross-sectional view particularly illustrating the manifold or body of the apparatus to which the pressure tank is attached.

FIG. 3 is an end view of FIG. 2 with the leg structure shown holding the apparatus in upright position for use.

FIG. 4 is a similar view with the leg structure shown of the apparatus in nonuse but in a position for pressurizing from an independent source of supply.

FIG. 5 is a cross-sectional view taken on lines 5—5, FIG. 2, particularly illustrating the leg supporting structure attached to the apparatus.

Referring more in detail to the drawings:

1 designates a leak detector apparatus embodying the features of our invention comprising a pressure tank 2 and the tank or apparatus to be tested is shown at 3, both of which tanks are connected to a bubble chamber 4 carried by a manifold or body 5. The bubble chamber 4 is glass, Lucite or some similar transparent material and encloses a supply of liquid 6 such as mercury, carbon tetrachloride, antifreeze, water or the like. The bubble chamber is connected to the underneath side 7 of the manifold 5 by bolts 8 extending through the manifold and through a plate 9 on the underneath side of the chamber 4. A resilient cushioning member 10 is between the plate 9 and bottom 11 of the chamber 4 and a resilient washer or gasket 12 is between the upper edges of the chamber 4 and the underneath side 7 of the manifold 5.

Opposite sides 13 and 14 of the manifold 5 have inwardly extending sockets or bores 15 and 16 and near the inner ends of the sockets the lower portion of the manifold 5 has threaded openings 17 and 18 which intersect said bores and which lead to the interior of the chamber 4. Threaded into the openings 17 is a tube 19 and threaded into the threaded opening 18 is a shorter tube 20, the free ends of both the tubes are turned laterally as indicated at 21 and 22 (FIG. 2).

The socket 15 is counter-bored and threaded as indicated at 23 for receiving a threaded nipple 24 to the outer end of which is attached a T connection 25 having threaded openings 26 and 27. Secured in the threaded openings 26 is a gauge 28 and secured in the threaded openings 27 is a nipple 29 to the free end of which is attached an elbow 30 and to the elbow is attached a nipple 31 connected to a threaded tubular member 32 on the end 33 of the tank 2, thus providing a tubular or line connection from the tank 2 to the bubble chamber 4. The bore 16 is counter-bored and provided with threads as indicated at 16' (FIG. 2) to which is attached a tubular elbow 34. A tubular member 35 is connected as indicated at 36 to the elbow 34 and the storage tank 3 has a tubular member 37 in the end thereof and the tube 35 has a removable connection 38 for attachment thereto.

A collar 39 is provided for attachment to the portion 40 of the elbow 30 and is secured thereto by a screw 41 having its end extending through a threaded opening 42 in the collar as illustrated in FIG. 2, and engaging in a groove 42' in the portion 40 of the elbow. The collar is provided with spaced threaded openings 43, 44 and 45 for receiving bolts or pins 46, 47 and 48 which act as legs to support the apparatus in upright or side position as will later be described.

With the apparatus assembled and constructed as described the tubular member 35 is attached to the storage tank through the couplings as described. The apparatus is then rotated so that the ends 21 and 22 of the tubes 19 and 20 will be out of the liquid 6 in the bubble chamber 4 as illustrated in FIG. 4. The body 5 is provided with a threaded opening 49 and a bore 49' leading to the bubble chamber 4. A valve 50 is secured in the threaded opening 49. An air line hose 51 is connected to a source of air supply (not shown) and has a connection 52 to the valve 50 to supply said air and pressure introduced into the pressure tank 2 and also the tank 3 or the piping system until the pressure is equalized, and as an example, one hundred pounds per square inch. The valve 50 will prevent the pressure from flowing from the apparatus after the air pressure hose is removed. The apparatus is then turned approximately 90° or until it is supported by the legs 47 and 48, as shown in FIG. 3, wherein the end 21 of the tube 19 will be submerged in the liquid 6. The pressure will be indicated on the gauge 28 by the indicator 54. If there is no leak in the tank there will be nothing shown in the bubble chamber 4.

If a leak exists in the storage tank or piping system, the pressure therein will decrease and be less than the pressure in the tank 2 whereby the pressure in the pressure tank 2 flows through the connection with the body through the line 19 past the curved tip 21 and will form bubbles as indicated at 53, FIG. 2, in the liquid 6 which indicates a leak in the tank 3 or piping system.

It will be obvious that the apparatus may be attached to any pipe line system, piping system in buildings or storage tanks. For the best results, the apparatus operates the best when the temperature of the vessel or piping system does not change during the test. If there is a change in temperature in the storage tank or piping system wherein the pressure will decrease there may be a slight decrease in pressure which will cause a few bubbles but this is easily detectable by the operator who can easily determine whether it is a leak or whether it is merely a drop in temperature.

It will be obvious from the foregoing that we have provided an improved leak detecting apparatus wherein the device may be rotated for pressurizing and which may be quickly and easily applied to the apparatus to be tested for use.

It is to be understood that we have illustrated and described one form of our invention, it is not to be limited to the specific form or arrangement of parts herein described and shown except insofar as such limitations are included in the claims.

What we claim and desire to secure by Letters Patent is:

1. Apparatus for detecting leaks in a closed system comprising, a pressure tank, a body, a transparent bowl partially filled with liquid attached to one side of said body member, said body member having bores extending inwardly from opposite sides thereof and threaded openings intersecting said bores and leading into said bowl, tubes engaging in said threaded openings, one of said tubes being longer than the other and of a length so that its free end will be submerged in said liquid when the apparatus is in position for use, a tubular line leading from one of said inwardly extending bores to said pressure tank, a gauge connected to said tubular line between said bore and said tank, a tubular line attached to said other inwardly extending bore, means on its free end for attachment to said closed system, means in said body member leading to said bowl for supplying air to said pressure tank to equalize the pressure in said tank with said closed system, means for holding said bowl in upright position with the free end of one of the tubes therein submerged in said liquid, and means for supporting said apparatus in another position with said end of the longer tube not submerged for supplying air to said apparatus without passage through said liquid.

2. Apparatus for detecting leaks in a closed system comprising, a pressure tank, a body, a transparent bowl partially filled with liquid attached to one side of said body member, said body member having bores extending inwardly from opposite sides thereof and threaded openings intersecting said bores and leading into said bowl, the inner ends of said bores being spaced from each other, liquid in said bowl, tubes engaging in said threaded openings, one of said tubes being longer than the other and of a length so that its free end will be submerged in said liquid when the apparatus is in position for use, a tubular line leading from one of said inwardly extending bores to said pressure tank, a gauge connected to said tubular line between said bore and said tank, a tubular line attached to said other inwardly extending bore, means on its free end for attachment to said closed system, means in said body member between the inner ends of said bores leading to said bowl for supplying air to said pressure tank to equalize the pressure in said tank with said closed system, leg means for holding said bowl in upright position with the free end of the longer tube submerged in said liquid, and leg means for supporting said apparatus in another position with said end of the longer tube not submerged for supplying air to said apparatus without passage through said liquid.

3. Apparatus for detecting leaks in a closed system comprising, a pressure tank, a body, a transparent bowl partially filled with liquid attached to one side of said body member, said body member having bores extending inwardly from opposites sides thereof and threaded openings intersecting said bores and leading into said bowl, the inner ends of said bores being spaced from each other, liquid in said bowl, tubes engaging in said threaded openings having their free ends curved from the straight portions thereof, one of said tubes being longer than the other and of a length so that its free end will be submerged in said liquid when the apparatus is in position for use, a tubular line leading from one of said inwardly extending bores to said pressure tank, a gauge connected to said tubular line between said bore and said tank, a tubular line attached to said other inwardly extending bore, means on its free end for attachment to said closed system, means in said body member between the inner ends of said bores leading to said bowl for supplying air to said pressure tank to equalize the pressure in said tank with said closed system, a collar on said tubular line leading to said pressure tank, a plurality of legs having one of their ends attached to said collar in spaced relation, two of said legs being used to hold said bowl in upright position with the free end of the longer tube therein submerged and one of said two legs and another leg being used for supporting said apparatus in another position with said end of the longer tube not submerged for supplying air to said apparatus without passing through said liquid.

References Cited in the file of this patent

UNITED STATES PATENTS

| | | |
|---|---|---|
| 1,149,999 | Liebert | Aug. 10, 1915 |
| 2,796,757 | Peterson | June 25, 1957 |
| 3,014,361 | Black | Dec. 26, 1961 |